Figure 1:
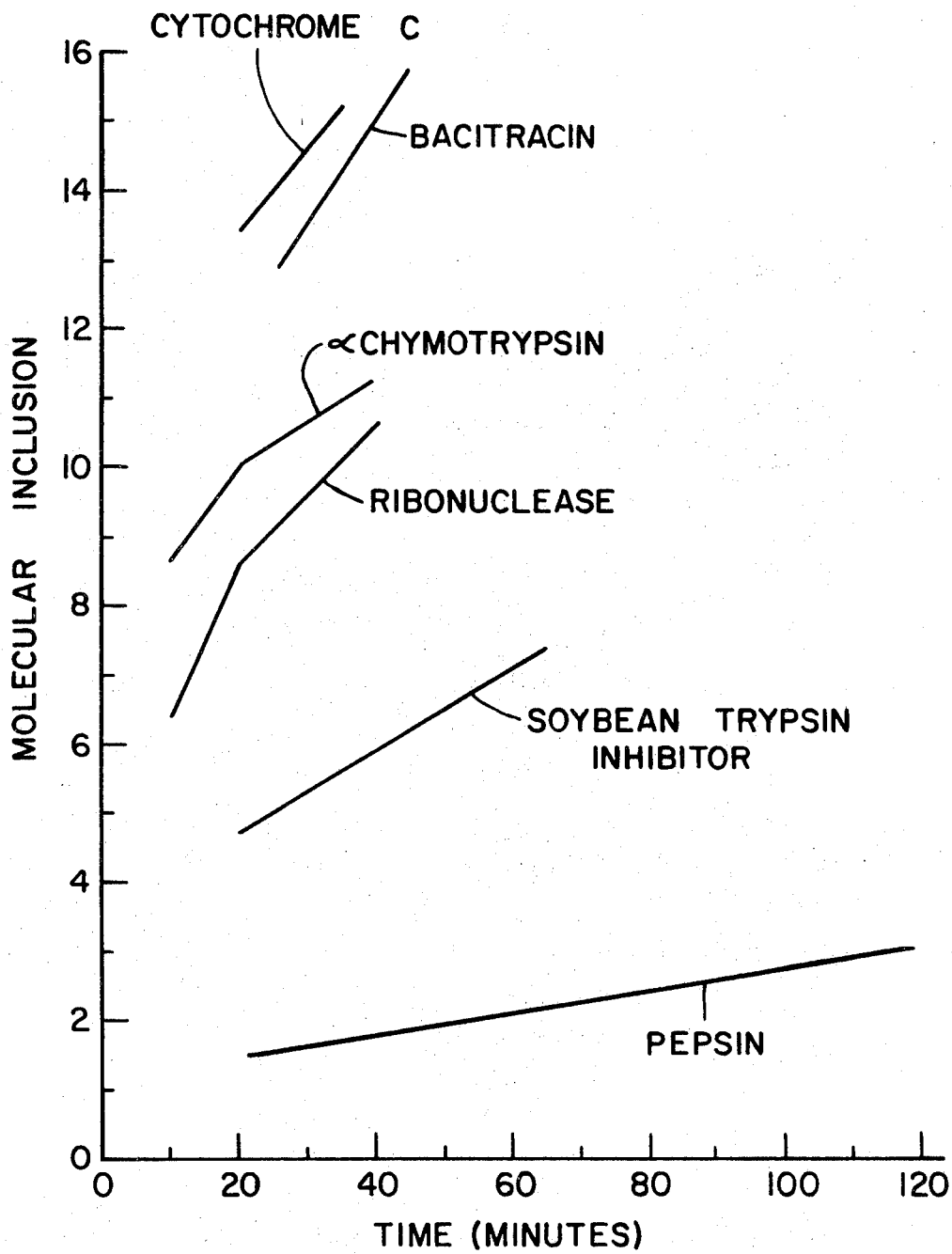

United States Patent

[11] 3,630,682

| [72] | Inventor | Ralph A. Messing<br>Horseheads, N.Y. |
| --- | --- | --- |
| [21] | Appl. No. | 30,486 |
| [22] | Filed | Apr. 21, 1970 |
| [45] | Patented | Dec. 28, 1971 |
| [73] | Assignee | Corning Glass Works<br>Corning, N.Y. |

[54] DETERMINATION OF MOLECULAR WEIGHTS OF PROTEINS
4 Claims, 2 Drawing Figs.

[52] U.S. Cl. .................................................. 23/230 R,
73/61.1 R
[51] Int. Cl. ....................................................... G01n 31/06,
G01n 21/00, G01n 33/00
[50] Field of Search .......................................... 23/230,
253, 259; 73/61.1 C

[56] References Cited
UNITED STATES PATENTS

| 3,471,261 | 10/1969 | Patterson ..................... | 23/230 |
| 3,531,490 | 9/1970 | Friedman et al. ............ | 260/294.8 |

Primary Examiner—Joseph Scovronek
Assistant Examiner—R. E. Serwin
Attorneys—Clarence R. Patty, Jr. and Gerhard K. Adam ABSTRACT: A method for determining the molecular weights of proteins by placing a dilute aqueous solution of the protein in contact with a porous 96 percent Silica glass membrane. At various time intervals, the percent loss of protein from solution to the membrane is calculated. A molecular weight of the protein is inversely proportional to the rate of molecular inclusion after a predetermined time.

MOLECULAR WEIGHT
CALIBRATION CURVE

MOLECULAR INCLUSION KINETICS

MOLECULAR WEIGHT CALIBRATION CURVE

DETERMINATION OF MOLECULAR WEIGHTS OF PROTEINS

Proteins are complex polymers of amino acids linked together by peptide bonds. The proteins are classified as simple proteins yielding only alpha-amino acids on hydrolysis and as conjugated proteins which yield alpha-amino acids and one or more groups of a nonprotein nature. Some indication of the complexity of the proteins is the fact that about 20 different alpha-amino acids have been identified as direct products of hydrolysis of proteins and that the molecular weights in proteins are extremely high. Heretofore, molecular weights have been determined by osmotic pressure measurements, from rates of diffusion, from sedimentation data in the ultracentrifuge, and by gel filtration.

In accordance with the present invention I have found a novel method of determining the molecular weights of proteins. The method involves dissolving the protein in an aqueous buffered solution, measuring the concentration of the protein in the solution initially, placing the solution in contact with a porous 96 percent Silica glass membrane whereby the protein diffuses into the membrane and measuring the concentration of protein in the solution after predetermined intervals of time. The data is used to calculate the percent loss of protein from the solution at the predetermined intervals and to produce a curve having a first slope and a second slope upon plotting the calculations on linear coordinates. From this curve the second slope is determined and compared to the second slope of a standard curve to obtain the molecular weight of the protein.

Initially the protein is dissolved in an aqueous-buffered solution. The amount of protein is in the range of about 0.1–2.0 mg./ml. with the preferred amount being about 0.5 mg./ml. The instrumentation for measuring the protein concentration does not permit a determination of less than 0.1 mg./ml. On the other hand, the maximum amount of protein is limited by the amount of available surface area capable of reacting with the protein. Further, the maximum amount is also limited by the molecular weight of the protein, in that as the molecular weight of the protein is increased, less surface area is available. The aqueous solution must be buffered to control the surface conditions of the protein and the glass. For example, the amount of silanol groups (SiOH) available depends on the pH of the solution. As the acidity is increased the number of silanol groups available are also increased. More specifically the pH of the solution should not be less than about 3.5 at which denaturation of the protein occurs and also below which the dissociation of the silanol groups occur. On the other hand, the pH should not be above about 10.0 which also causes denaturation of the protein and tends to dissolve the surface of the glass. The preferred pH is about neutral. Common buffers include phosphates (pH 5.2–10.0) acetates (pH 3.5–6.5) and citrates (pH 5.0–7.0). The concentration of the protein in solution can be initially determined with a spectrophotometer. A wavelength of about 280 millimicrons is used at which maximum absorption occurs.

Thereafter the buffered protein solution is placed in contact with a porous 96 percent Silica glass membrane. These membranes are made by the well-known procedure of making a porous glass body, by heat treating a certain glass to cause a separation into an acid-soluble phase and an acid-insoluble phase and then extracting the soluble phase. Hood et al., U.S. Pat. No. 2,106,744 describes in detail a method of making a porous glass composed of over 94 percent Silica from an alkali borosilicate glass, by thermally treating the glass to separate it into two phases one of which is composed essentially of nonsiliceous constituents and extracting this soluble phase by leaching in dilute acid. This leaves a highly siliceous structure containing its original shape and having a multiplicity of interconnecting, submicroscopic pores, which is desired may be closed to produce a nonporous transparent glass by a subsequent heating. Glasses resulting from such method are known in the art by the designation "96 percent Silica glasses" and this general designation is used herein with that meaning. It will be understood that the term is used in the generic sense to include all glasses produced in accordance with the above-described method irrespective of the exact silica content of the ultimate glass. The pore size of the 96 percent Silica glass can be enlarged in accordance with the teachings of Chapman et al., U.S. Pat. No. 3,485,687. Larger pore size material may also be made in accordance with the teachings of Haller, U.S. Ser. No. 507,092. The pore size of the membrane is in the range of about 30–1,000A with the preferred range being 60–200A. It is readily apparent that the larger the pore size the greater the molecular weight of the protein which can be molecularly included; whereas the smaller the pore size the smaller the maximum molecular weight of the protein which can be determined. For example, the porous glass membrane can be in the form of test tubes made from Corning Code 7930 porous glass having a pore diameter of about 75A. It is desirable that the temperature of the solution be very low, and preferably less than about 10° C. to avoid any possible hydrolysis of the proteins. The higher the temperature, the greater the rate of reaction between the porous glass membrane and the protein. Therefore, the temperature should be controlled in a narrow range, i.e., ±0.5° C. to obtain meaningful and reproducible results. Furthermore, it is recommended that the protein solution be stirred during the contact with the membrane.

At predetermined intervals, e.g., 5 minutes, the concentration of the protein in the porous glass tube was determined. This was performed using the spectrophotometric procedure discussed above, by measuring the optical density at 280 millimicrons. The percent loss resulting from solution to the membrane defined as molecular inclusion (MI) was calculated by comparing the optical density of the reactive protein solution ($A_f$) at time ($t_f$) with that of the optical density of the original solution ($A_o$) at the initial time ($t_o$) as the following formula:

$$MI = [1-(A_f/A_o)]100$$

Figure 2:
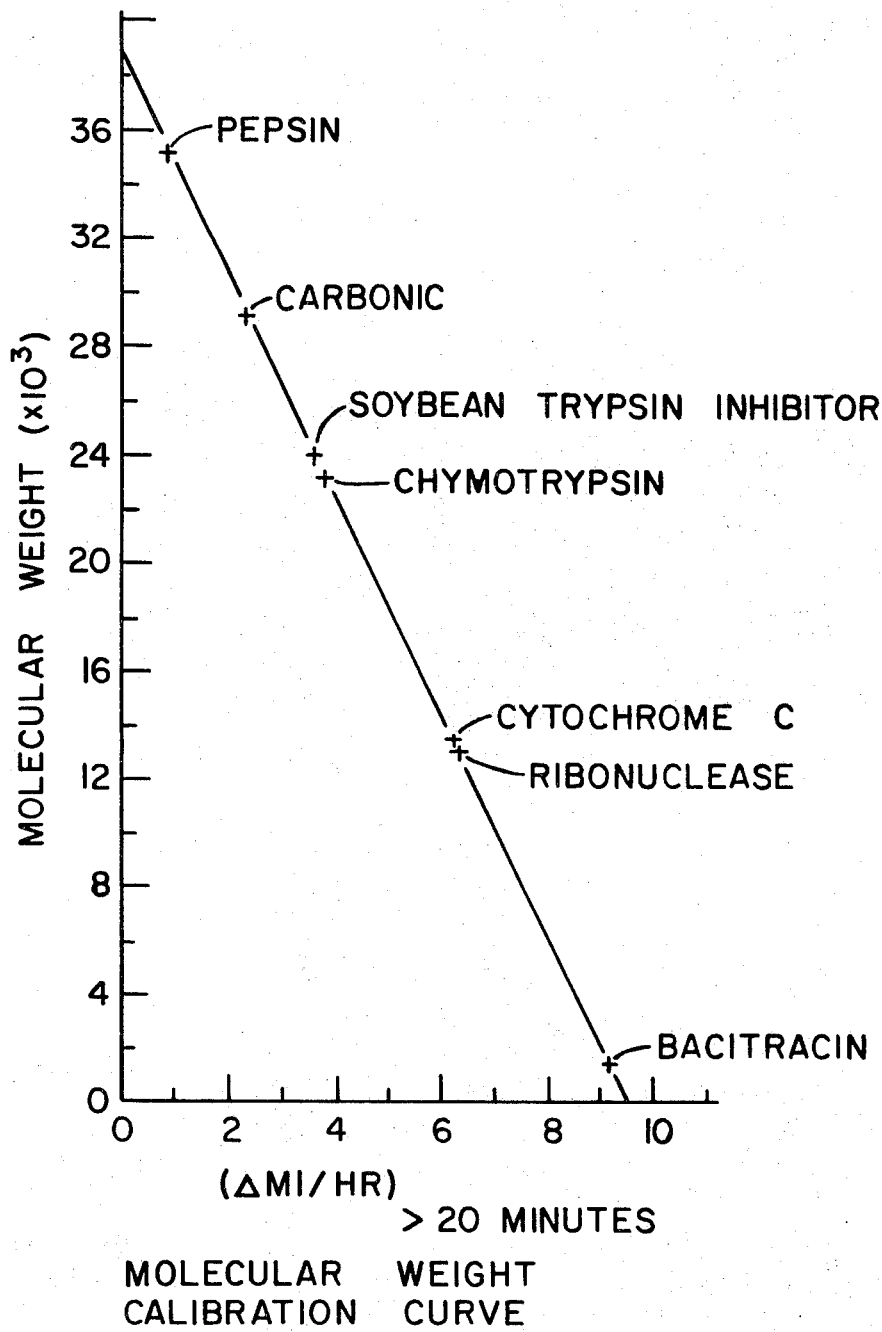

The invention is more clearly understood from the following description taken in conjunction with the accompanying drawings in which:

FIG. 1 is a graphic representation of the molecular inclusion kinetics of various proteins setting forth the molecular inclusion as a function of time; and FIG. 2 is a graphic representation of the molecular weight calibration curve which sets forth the molecular weight as a function of the rate of molecular inclusion after 20 minutes.

Referring now to FIG. 1, test tubes made of Corning Code 7930 porous glass, 10 mm. i.d., 12 mm. o.d., 11.5–13.0 cm. long, pore diameter 75A were equilibrated in 0.1M phosphate buffer, pH 7.0. The tubes were drained for 2 minutes before use. Individual tubes were used for the determination of each point.

Five millimeters of solution, precooled to 1° C. containing 0.5 mg./ml. of protein in 0.1M phosphate buffer, pH 7.0 was delivered to the tube at time zero ($t_o$). The tube was immersed in a cylinder containing a quantity of precooled 0.1M phosphate buffer, pH 7.0 such that the meniscus of the cylinder matched the height of the meniscus in the tube after a stirrer had been immersed in the protein solution. The cylinder was jacketed in an ice bath. During the period of exposure to the porous glass tube, the protein solution was continually stirred with a vibrating stirrer. At the completion of the time interval ($t_f$), the protein solution was immediately transferred to a cuvette and the optical density was measured at a wavelength of 280 millimicrons. The percent loss of protein from solution to the membrane (MI) was calculated from the equation above.

The results are shown in FIG. 1. It was observed that the protein was removed from solution too rapidly during the first 20 minutes of exposure to the porous glass to obtain reliable quantitative information. This first period is designated as the first slope ($k_1$). After the initial reaction the rate of inclusion of protein in the membrane was considerably diminished and the determination became reproducible. Molecular inclusion appeared to be linear with respect to time for approximately 70 minutes, after the initial 20 minutes of reaction, and the slope over this period is designated as the second slope ($k_2$). The results of the proteins tested and the second slop obtained are further set forth in the table below:

TABLE

| protein | Molecular weight | Second slope ($k_2$) |
| --- | --- | --- |
| Bacitracin | 1,411 | 9.2 |
| Ribonuclease | 12,700 | 6.0 |
| Cytochrome C | 13,000 | 6.6 |
| α-Chymotrypsin | 23,000 | 3.8 |
| Soybean Trypsin Inhibitor | 24,000 | 3.6 |
| Carbonic Anhydrase | 29,000 | 2.4 |
| Pepsin | 35,000 | 1.0 |

From this data the molecular weight calibration curve was prepared, as shown in FIG. 2. When the rate of molecular inclusion after 20 minutes is plotted against the molecular weight of the protein, an inverse relationship becomes apparent. Using the molecular weight calibration curve of FIG. 2 it is possible to obtain the molecular weight of an unknown protein by calculating the second slope ($k_2$) for that particular protein from the molecular inclusion kinetics study.

It will be appreciated that the invention is not limited to the specific details shown in the examples and illustrations, and that various changes or modifications may be made within the ordinary skill in the art without departing from the spirit and scope of the invention.

I claim:
1. A method of determining the molecular weight of a protein comprising the steps of:
  a. dissolving the protein in an aqueous buffered solution;
  b. measuring the concentration of the protein in the solution initially;
  c. placing the solution in contact with a porous 96 percent silica glass membrane whereby the protein diffuses into the membrane;
  d. measuring the concentration of protein in the solution after predetermined intervals of time;
  e. calculating the percent loss of protein from the solution at said intervals, the curve produced upon plotting the calculation on linear coordinates having a first slope and a second slope;
  f. determining the second slope of the curve from said plot; and
  g. comparing the second slope of the curve to a standard to obtain the molecular weight of the protein.
2. The method of claim 1 wherein the pore size of the membrane is in the range of 30–1,000A.
3. The method of claim 2 wherein the pore size of the membrane is in the range of 60–200A.
4. The method of claim 1 wherein the second slope is calculated over a period of 20–90 minutes after the solution is placed in contact with the membrane.

* * * * *